July 5, 1966  W. J. HALL  3,258,867
PHOTOGRAPHIC SLIDE MAGAZINE
Filed Aug. 6, 1963  3 Sheets-Sheet 2
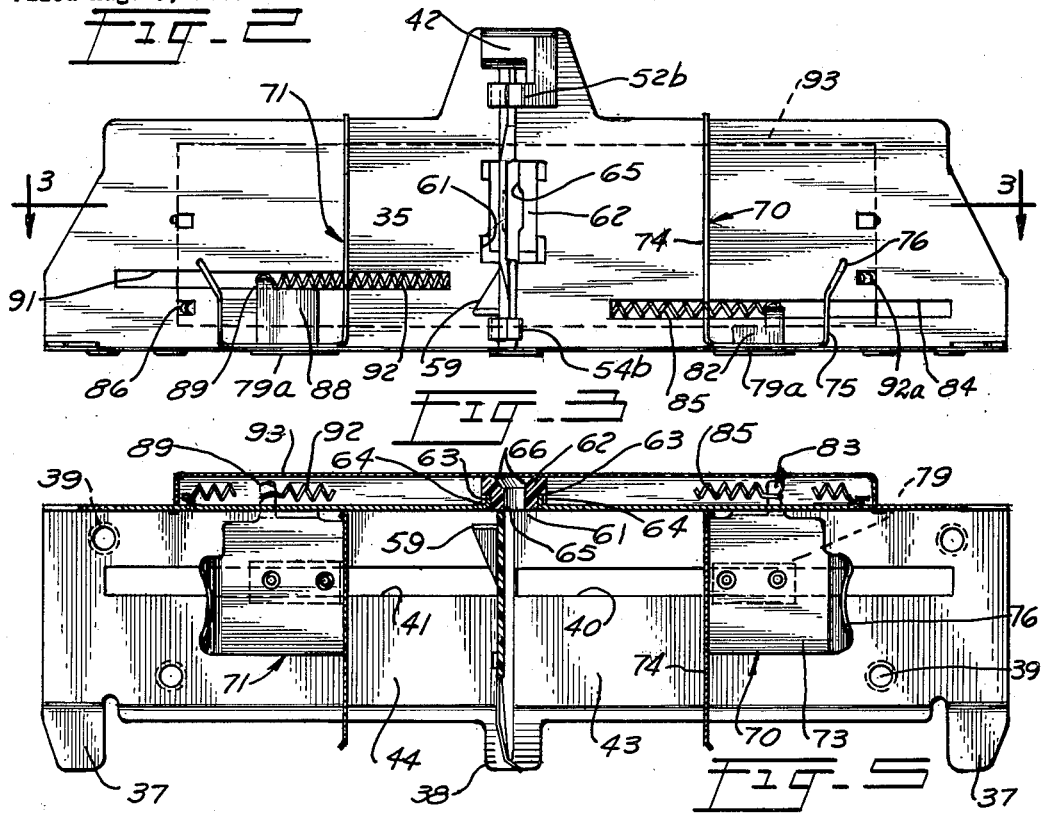
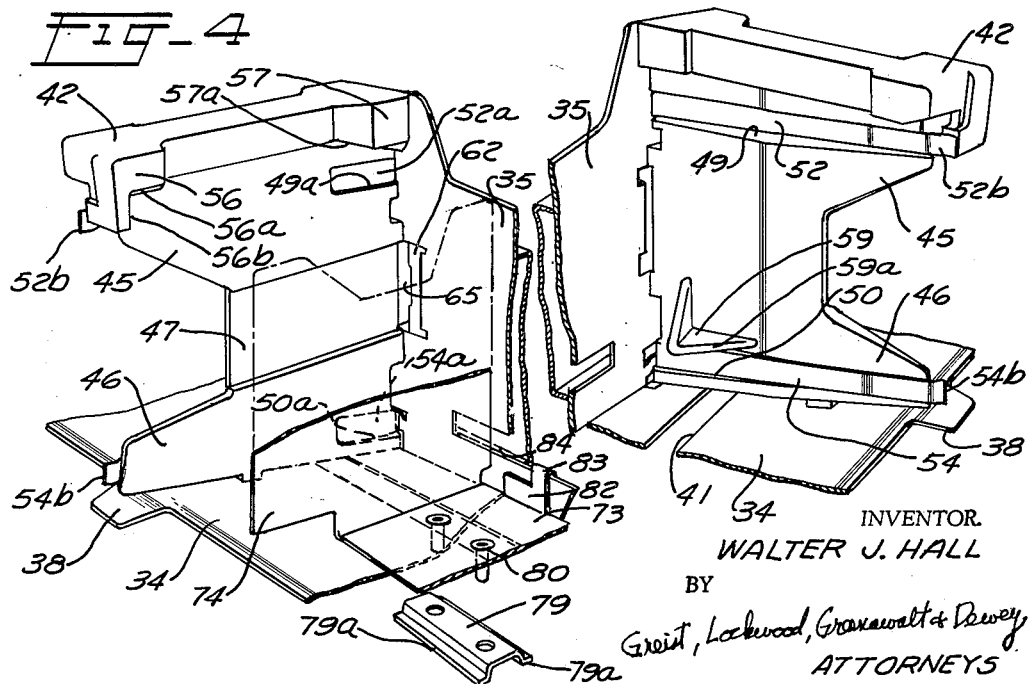
INVENTOR.
WALTER J. HALL
BY
Greist, Lockwood, Greenawalt & Dewey
ATTORNEYS July 5, 1966 W. J. HALL 3,258,867
PHOTOGRAPHIC SLIDE MAGAZINE
Filed Aug. 6, 1963 3 Sheets-Sheet 3
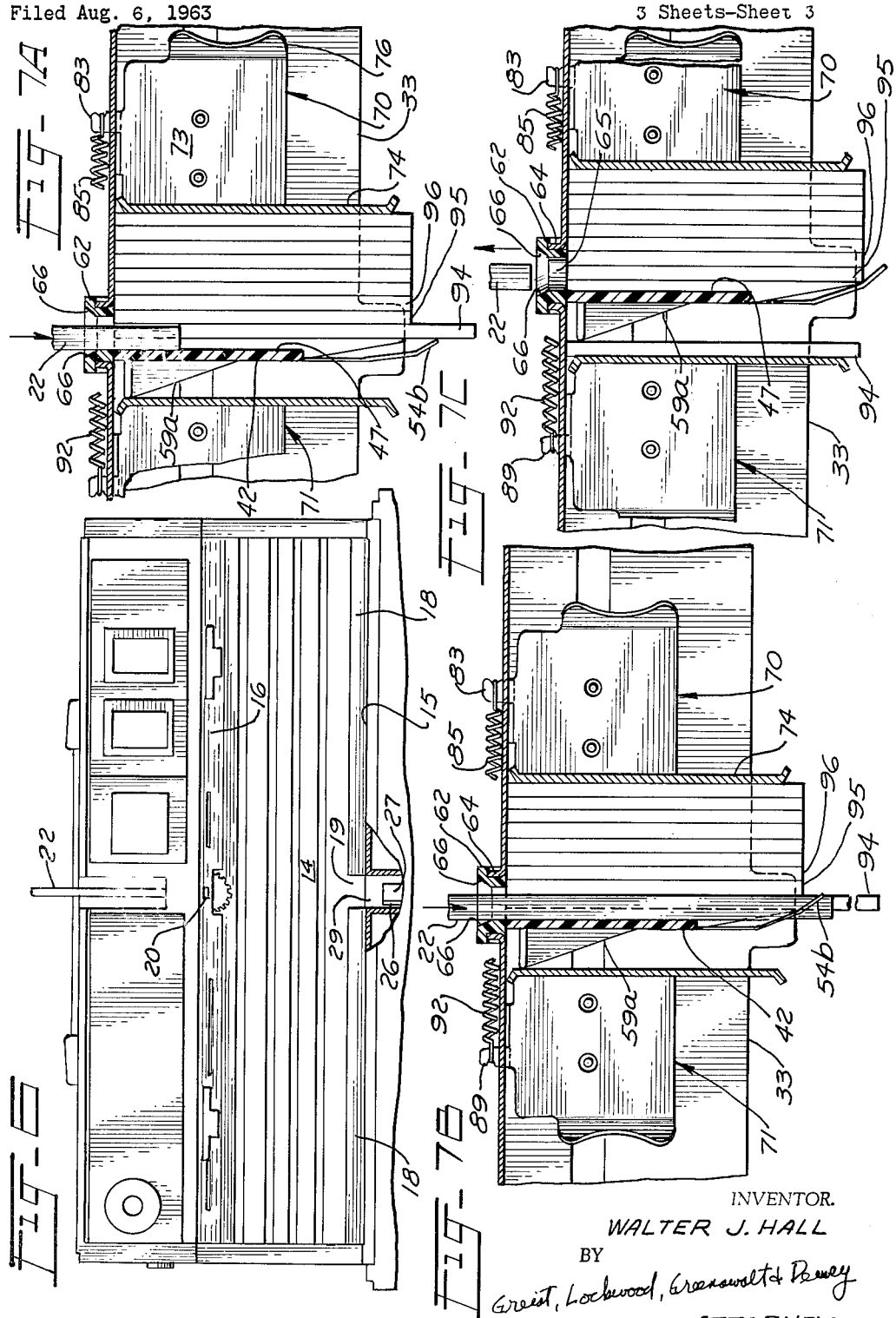
INVENTOR.
WALTER J. HALL
BY
Greist, Lockwood, Greenawalt & Dewey
ATTORNEYS

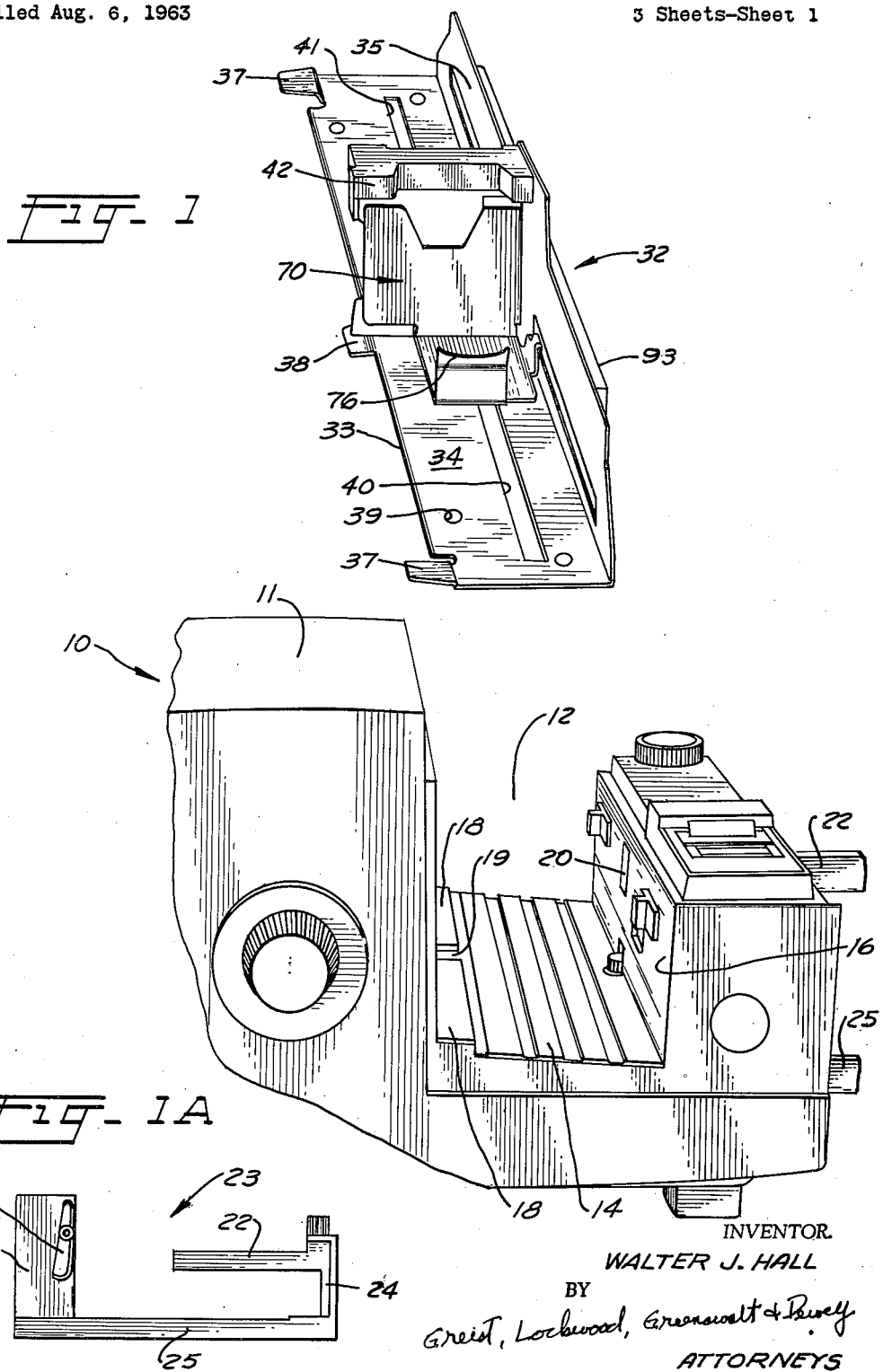

United States Patent Office 3,258,867
Patented July 5, 1966

3,258,867
PHOTOGRAPHIC SLIDE MAGAZINE
Walter J. Hall, Chicago, Ill., assignor to Sawyers Research Development Corporation, Chicago, Ill., a corporation of Delaware
Filed Aug. 6, 1963, Ser. No. 300,248
6 Claims. (Cl. 40—79)

This invention relates to photographic slide magazines for use with slide projectors and more particularly to a new and improved bulk or stack-type photographic slide magazine or loader for use with a projector of the type adapted to use a box-like slide tray.

Most present-day slide projectors are designed to accommodate elongated slide trays of the type adapted to support a number of photographic slides in parallel spaced relation. These slide trays include a plurality of parallel, spaced-apart partitions or septums defining individual slide receiving spaces. Projectors designed to use such trays are normally provided with a tray-receiving groove or channel for operatively receiving the slide tray. Such a projector and a slide tray therefor are shown in Brown application, Serial No. 824,877, filed July 3, 1959, now Patent No. 3,120,150. Projectors of this type include suitable slide changing mechanism reciprocal transversely of the groove for moving a slide from the tray to a viewing position in the projector and returning the slide from the viewing position to its same space in the tray. The slide changing mechanism is operatively associated with suitable means for indexing or advancing the tray during each stroke of the slide changing mechanism so that successive slides are shown upon reciprocation of the slide changing mechanism.

Slide trays of the type described have proved to be satisfactory and are in widespread use. However, these trays have the disadvantages of being somewhat time consuming in loading and of being rather bulky in size as compared with the number of slides contained by the trays. This time consuming factor results from the necessity of inserting the slides individually in the slide tray spaces. The bulky size of these trays results from the wasted space between the slides which is occupied by the partition members of the slide tray and the clearance spaces between the slides and the partitions for allowing free movement of the slides into and out of the slide tray spaces.

Slide projectors have heretofore been provided which include a slide changing mechanism incorporating a magazine of the type adapted to support photographic slides in face-to-face or stacked relation. This type of slide magazine, which may be referred to as a bulk-type magazine or stack loader, has in the past been specially constructed as an integral part of the slide changing mechanism of the projector. Therefore, it is a primary object of this invention to provide a bulk-type photographic slide magazine in the nature of an attachment or an adapter for use (in place of a slide tray) with a slide projector of the type having a slide tray receiving groove and a slide changing mechanism reciprocal transversely of the groove.

Another object of the present invention is the provision of a bulk-type photographic slide magazine for use with a slide projector of the type including a generally horizontally extending slide tray receiving groove, which slide magazine is adapted to be detachably or removably seated in the groove and which magazine includes means for positioning the same in the groove for proper alignment with the slide changing mechanism of the slide projector.

Even another object of the present invention is the provision of a bulk-type photographic slide magazine for use with a slide projector of the type including a generally horizontally extending slide tray receiving groove, which magazine includes guide means for cooperating with the pusher bar of the slide changing mechanism of the projector, whereby the magazine is positioned axially of the groove upon engagement of the guide means by the pusher bar.

Still another object of the present invention is the provision of a bulk-type photographic slide magazine for use with a projector of the type including a slide tray receiving groove and a slide changing magazine reciprocal transversely of the groove, which magazine includes means for preventing jamming of the slides as they are deflected from a supply area in the magazine to a take-up area therein upon reciprocation of the slide changing mechanism.

These and other objects and advantages will become apparent from the following specification wherein like numerals refer to similar parts throughout.

In the drawings:

FIG. 1 is a fragmentary, perspective view showing the bulk slide magazine of this invention and a slide projector which uses either the slide magazine or a conventional elongated tray or a circular slide tray that has recently been made available;

FIG. 1a is a reduced side elevational view of a part of the slide changing mechanism of the projector fragmentarily illustrated in FIG. 1;

FIG. 2 is a front elevational view of the photographic slide magazine of this invention;

FIG. 3 is a horizontal section taken along line 3—3 of FIG. 2;

FIG. 4 is an enlarged, fragmentary perspective view of the magazine primarily showing one side of the partition plate thereof;

FIG. 5 is an enlarged, fragmentary perspective view of the photographic slide magazine primarily showing the other side of the partition plate thereof;

FIG. 6 is a fragmentary top plan view of the slide projector of FIG. 1;

FIG. 7A is an enlarged, fragmentary, horizontal section taken through the slide magazine and showing the disposition of the various parts during one phase of a slide changing operation;

FIG. 7B is a section similar to FIG. 7A and showing the disposition of the various parts during a successive phase of a slide changing operation; and FIG. 7C is a section similar to FIG. 7B and showing the disposition of the various parts during a successive phase of a slide changing operation.

Referring now to the drawings and in particular to FIGS. 1 and 6, a slide projector, generally designated 10, of the type adapted for use primarily with a box-like slide tray will be seen to include a housing 11 having a generally horizontally extending, open ended, slide tray receiving groove 12. Projector 10 may be of the type disclosed in the Brown application referred to above. Groove 12 is defined by a ribbed base 14 and opposite, parallel, inner and outer side walls 15 and 16, respectively. Base 14 includes a stepped-up portion 18 adjacent side wall 15, which stepped-up portion has a recess or notch 19 intermediate the length thereof. Outer wall 16 includes a pusher bar receiving opening 20 for receiving a pusher bar 22 of a slide changer, generally designated 23 and best seen in FIG. 1a. The slide changer, which may be of the type disclosed in the aforementioned Brown application, includes a handle portion 24 supporting pusher bar 22, a lower bar 25, an upstanding plate 26 supported from the end of bar 25 remote from the handle, and a flipper arm 27 pivotally supported from one side of plate 26 and operated in the manner disclosed in the Brown application. It will be understood that slide changer 23 forms a part of a slide changing mechanism and is reciprocal transversely of groove 12 for moving a slide supported in a known slide tray from the tray to a viewing position within the housing 11 during the inner stroke of the slide changer and for returning the slide to the tray upon the outward or return stroke of the slide changer. Inner wall 15 of groove 12 is provided with a slide receiving slot 29 in alignment with slot 20 for receiving a slide moved transversely of the groove by the slide changing mechanism.

Slide projector 10 and the slide changing mechanism thereof will not be described in greater detail herein as of themselves they form no part of the present invention. It will be understood, however, that the bulk-type slide magazine of this invention may be adapted for use on any slide projector of the type having a slide tray receiving groove and a slide changing mechanism reciprocal transversely of the groove and including a pusher bar.

The bulk-type photographic slide magazine of this invention, generally designated 32, will be seen to include an elongated frame 33 having a right angle cross-section defined by a bottom plate 34 and a side plate 35. Bottom plate 34 includes a pair of end tabs 37 and a center tab 38 extending from the free side edge thereof. Bottom plate 34 is also provided with a plurality of bosses 39 depending from the underside thereof.

The photographic slide magazine includes a centrally disposed partition plate 42, which may be of molded plastic counstruction, extending transversely of the frame intermediate the length thereof and suitably secured to bottom plate 34 and side plate 35. Partition plate 42 defines a slide supply area 43 on one side thereof and a slide take-up area 44 on the other side thereof. As best seen in FIGS. 4 and 5, partition plate 42 is cut away at the vertical side edge thereof remote from plate 35 for forming an upper and lower tongue portions 45 and 46.

A linear pusher bar receiving recess 47 is formed in the side of the partition plate defining the magazine supply area, the cross-sectional area of recess 47 preferably being approximately equal to one half the cross-sectional area of the pusher bar of the slide projector which uses the magazine. The partition plate includes, in the side thereof defining the magazine take-up area, upper and lower horizontally extending recesses 49 and 50, respectively, each of which recesses joins with a notch (not shown) formed in the vertical edge of the partition plate adjacent frame side plate 35. A short horizontally disposed recess 49a is formed in the side of the partition plate defining the magazine supply area, which recess joins with the notch joining with recess 49. In like manner, a short horizontally extending recess 50a is provided in the side of the partition plate defining the supply area, which recess joins with the notch joining with recess 50. A spring arm 52 is seated in recess 49, the spring arm being provided with a doubled back end portion 52a which wraps around the notch joining with recess 49 and seats in recess 49a. Spring arm end portion 52a is double back on spring arm 52 for securely gripping the partition plate to hold the spring arm in place and in a manner so that the free end of the spring arm is constantly urged into engagement with upper tongue portion 45.

A spring arm 54, identical in construction with spring arm 52, is provided in lower recess 50. Spring arm 54 includes an end portion 54a double back on the spring arm, which end portion is received in recess 50a. It will be understood that spring arm end portion 54a grips recess portion 50a for securing the spring arm to the partition plate and in a manner so that the free end of spring arm 54 is constantly urged against one side of lower tongue portion 46. It will be noted that the spring arms have respective tip portions 52b and 54b which are bent from the main portion of the arms so that the tips extend across the vertical plane containing the partition plate. Or in other words, these spring arm tip portions extend from one side of the partition plate to the other side thereof.

As best seen in FIG. 4, partition plate 42 includes integral, inner and outer corner extensions 56 and 57 at the upper portion thereof. Extension 56 includes beveled surfaces 56a and 56b, and extension 57 includes a beveled surface 57a. The purpose of these beveled surfaces will be explained below when describing the operation of the slide magazine.

As best noted in FIG. 5, the side of partition plate 42 defining the take-up area includes an integral projection 59 having an inclined surface 59a extending horizontally and outwardly from this side of the partition plate toward frame side plate 35. The purpose of this projection will be referred to hereinbelow.

Side plate 35 of frame 33 is provided with an opening 61 for receiving a generally rectangular guide block 62. The guide block includes a pair of recesses 63 in opposite vertical sides thereof for receiving respective tabs 64 bent outwardly from plate 35 at opposite sides of opening 61 therein. The engagement of the tabs in the guide block recesses serves as a means for securing the guide block in the opening in frame side plate 35.

The guide block is provided with a central opening 65 which is vertically elongated and rectangular in cross-section. It will be understood that opening 65 in the guide block is adapted to receive freely the pusher bar of slide changing mechanism of the type illustrated in FIG. 1a, and it will be understood that guide block 63 is vertically and longitudinally positioned on the frame so that the pusher bar passing through opening 65 is received in part in recess 47. As the depth of recess 47 is approximately equal to one-half the thickness of the pusher bar, only one half of the pusher bar is received in recess 47. The reason for this constructional feature will become apparent hereinbelow. As best seen in FIGS. 3 and 7, the vertical side walls defining opening 65 have outwardly beveled wall portions 66. It will be understood that these beveled or inclined wall portions extend for the full height of opening 65.

Photographic slide magazine 32 includes a pair of pressure plates 70 and 71 mounted on the frame in supply area 43 and take-up area 44, respectively, for movement longitudinally of the frame. As the pressure plates are opposite hand but are otherwise substantially identical in construction, only one pressure plate, viz., pressure plate 70, will be described in detail.

Pressure plate 70 includes a base plate portion 73 integral with a vertical plate portion 74 which extends parallel with partition plate 42. Extending integrally and upwardly from plate 73 in parallel spaced relation from plate 74 is a plate portion 75 terminating in an outwardly bent finger gripping plate portion 76. A slide plate 79 (FIG. 4) is secured to the underside of plate portion 73 by a number of rivets 80, which slide plate has opposite flange portions 79a extending in parallel spaced relation from the underside of frame base plate 34 for defining with base plate 34 a pair of opposite guide tracks for receiving opposite sides of slit 40 thereby adapting pressure plate 70 for sliding movement relative to the frame longitudinally thereof.

Extending integrally and upwardly from the edge of base plate portion 73 nears side wall 35 is a lug portion 82 having a horizontally and outwardly extending lug 83. Lug 83 is adapted for free sliding movement along a horizontally disposed slot 84 provided in side plate 35. A coil spring 85 has one end thereof secured to lug 83 and the other end thereof suitably anchored in an aperture 86 provided in plate 35 in horizontal spaced relation from slot 84. It will be apparent that coil spring 85 constantly urges pressure plate 70 toward the partition plate.

As best seen in FIG. 2, pressure plate 71 includes an upstanding lug portion 88 having a horizontally and outwardly extneding lug 89. It will be noted that lug portion 88 of pressure plate 71 has a greater height than the lug portion of pressure plate 70. Except for this difference, the pressure plates are identical opposite hand versions of each other.

Side plate 35 includes a horizontally extending slot 91. A coil spring 92 has one end thereof in engagement with lug 89 and the other end thereof secured in an aperture 92a provided in side plate 35 in horizontal spaced relation from slot 91. It will be apparent that spring 92 constantly urges pressure plate 71 toward the partition plate. As noted in FIG. 3, a housing or enclosure 93 is suitably secured to the outside of plate 35 for enclosing coil springs 85 and 92, the housing being provided with a suitable opening for accommodating guide block 62.

The operation of the photographic slide magazine of this invention is as follows:

A plurality of photographic slides 94, 95, 96, etc., disposed in face-to-face relation are loaded in supply area 43 of the magazine and are urged toward the partition plate by pressure plate 70. Plate 70 may be easily retracted for loading by grasping finger-gripping portion 76. The first two or three slides nearest the partition plate are guided laterally and vertically by engagement of upper corners of the slides with beveled surfaces 56a, 56b and 57a.

The magazine is then inserted in groove 12 of the projector with frame bottom plate 34 resting on base 14 of the groove. The magazine frame is shaped in cross-section to accommodate a particular slide projector groove. Bosses 39 engage groove base 14 and support frame bottom 34 slightly above the groove base to permit free sliding movement of slide plates 79. Center tab 38 on bottom plate 34 is received in recess 19 in the projector for locating the frame in its approximate position axially of groove 12. When the frame rests in groove 12, side plate 35 extends in parallel spaced relation with side wall 16 near the same. Of course, slide changing mechanism 23 must be retracted or moved outwardly of the projector to allow the magazine to be seated in the groove. Tabs 37, which are stepped-up to clear groove portion 18, may engage side wall 15 with housing 93 in engagement or in close proximity with wall 16 thereby positioning the magazine laterally in the groove. In some instances the free side edge of bottom 34 may engage groove portion 18 with housing 93 in engagement or in close proximity with wall 16. In any case, the over-all, lateral, horizontal dimension of the groove contacting portions of the magazine is such relative to the width of the groove to permit the magazine to be freely inserted in the groove.

With tab 38 of the frame disposed within groove recess 19 as just described, pusher bar 22 is in registry with the opening in the outside surface in the guide block defined in part by inclined side walls 66. When pusher bar 22 moved inwardly or toward the projector during a slide changing cycle, the end of the pusher bar enters opening 65 of the guide block. If the magazine is not in exact alignment with the pusher bar, i.e., if the frame is not in its proper position longitudinally of the groove, the action of the pusher bar passing through opening 65 in the guide block serves to move the frame axially of the groove for accurately positioning the same therein. This final axial adjustment or positioning of the frame is brought about by contact of the end of the pusher bar with one of the inclined sides 66 defining sides of the guide opening.

After the pusher bar passes through the guide opening in guide block 62, the end of the pusher bar engages the outer vertical edge of the slide adjacent the side of the partition plate defining the supply area, viz., slide 94. It will be recalled that only approximately one-half of the pusher bar, i.e., one longitudinal half of the bar, is received in partition recess 47, thereby leaving the other half of the end of the pusher bar for engagement with the vertical outer edge of the slide adjacent the partition plate. Continued movement of the pusher bar toward the projector results in sliding movement of slide 94 between the partition plate and the next slide 95. As slide 94 moves relative to the partition plate, it engages spring arm tips 52b and 54b thereby deflecting the spring arms away from the partition plate for allowing passage of the slide (FIG. 7A). Pusher bar 22 continues its movement transversely of the groove until slide 94 is positioned wholly within the projector housing to the viewing position therein. After the outer vertical edge of slide 94, i.e., the edge being engaged by the end of the pusher bar, passes beyond the tips of the spring arms, the spring arms snap back into their normal position in the recesses in the partition plate (FIG. 7B). In this normal position of the spring arms, tips 52b and 54b extend across the inner edges of respective tongue portions 45 and 46.

During the outward or the return stroke of the slide changing mechanism, the other vertical edge of slide 94 is engaged by flipper arm 27 or other suitable abutment means provided on the inner end of the reciprocal slide changing mechanism. During this outward movement of slide 94, this slide is deflected into the take-up area of the magazine by reason of engagement of the outer vertical edge of the slide with the spring arm tips 52b and 54b, i.e., the outer vertical edge of the slide engages the slides of the spring arms which extend outwardly of the partition plate. Continued outward movement of the slide changing mechanism results in sliding movement of slide 94 through slide receiving slot 29 and then along the side of the partition plate defining the take-up area.

After returning slide 94 is returned about half-way into the take-up area, the outer vertical edge of this slide engages inclined surface 59a of projection 59. Continued outward movement of the slide results in movement of the same along inclined surface 59a thereby forcing pressure plate 71 away from the partition plate to receive slide 94 as illustrated in FIG. 7C. Inclined surface 59a on projection prevents the returning slides being deflected into the take-up area from being pressed into parallel relation with the partition plate by pressure plate 71 until the returning slides are wholly disposed within the take-up area. This prevents the vertical edge of the slide in engagement with the flipper arm or like abutment means in engagement with the vertical edge of the slide from being prematurely separated from the flipper arm during return movement of the slide. This premature separation of the slide from the flipper arm causes jamming of the slide magazine.

During this return movement of the slide changing mechanism, pusher bar 22 is retracted from groove 47 and passes outwardly through guide opening 65 in the guide block. Pressure plate 70 presses slides 95, 96, etc., toward partition 42 so that slide 95 is held adjacent the face of the partition plate defining the supply area thereby positioning slide 95 to be engaged by pusher 22 during its next inward stroke. It should be apparent that continued reciprocation of the slide changing mechanism results in successive movement of the slides from the magazine supply area to the viewing position in the projector and then into the magazine take-up area.

It will be apparent that the slide magazine of this invention permits a slide tray type of projector to accept and project slides disposed in face-to-face relation. The projector need not be modified in any way; accordingly, the slide projector maintains its capability of utilizing conventional slide trays. Manifestly, slide magazine 32 and slide trays may be quickly and easily interchanged as desired.

While the invention has been shown in but one form it will be obvious to those skilled in the art that it is not to be so limited, but on the contrary it is susceptible of various changes and modifications without departing from the spirit and scope of the appended claims.

I claim:

1. A photographic slide magazine for use with a slide projector of the type including a generally horizontally extending slide tray receiving groove defined in part by a side wall having a slide receiving slot, which projector further includes a reciprocating slide changer having an element for pushing a slide into said slot, said magazine including a frame adapted to rest in said groove, which magazine includes a partition plate on the frame defining a magazine supply area and a magazine take-up area, means on the frame for yieldably supporting a plurality of slides in face-to-face contact on both sides of said partition plate with one slide in adjoining parallel relation with the former on the supply side thereof, guide means on said frame adapted to cooperate with said pushing element upon movement thereof for adjustably moving said frame axially in said groove thereby accurately to locate said one slide for entering said slot.

2. A photographic slide magazine for use with a slide projector of the type including a generally horizontally extending slide tray receiving groove defined in part by a side wall having a slide receiving slot for receiving a slide moved transversely of the groove by a pusher bar on a reciprocal slide changing mechanism, said magazine comprising, an elongated frame adapted to be seated in said groove and extend along at least a portion of the length thereof on opposite sides of said slot, a vertically disposed partition plate on said frame extending transversely thereof and defining a slide supply area and a slide take-up area on opposite sides of the partition plate, a pair of pressure plates parallel with said partition plate and mounted on said frame in said areas, respectively, for movement longitudinally of the frame, resilient means on the frame engageable with each of said pressure plates for urging the latter toward said partition plate thereby adapting each of said pressure plates to support a number of slides in face-to-face contact with each other between the pressure plate and the partition plate in parallel relation with the latter, spring arm means adjacent the side of said partition plate defining the take-up area, which spring arm means is adapted to deflect a slide from said supply area to said take-up area upon reciprocation of said slide changing mechanism, and guide means on said frame defining a guide opening adjacent the vertical edge of the partition plate remote from said side wall for receiving said pusher bar, which guide means is adapted to cooperate with said pusher bar to position said frame axially of said groove upon being engaged by the pusher bar so that a slide in said slide supply area adjacent said partition plate is in alignment with said slide receiving slot.

3. The construction according to claim 2 wherein said guide opening is defined in part by opposite, vertical, inclined side walls of the guide means, whereby contact of the end of said pusher bar with one of said inclined walls causes movement of the frame axially of said groove for positioning of the frame.

4. A photographic slide magazine for use with a slide projector of the type including a generally horizontally extending slide tray receiving groove defined in part by a side wall having a slide receiving slot for receiving a slide moved transversely of the groove by a pusher bar on a reciprocal slide changing mechanism, said magazine comprising, an elongated frame having a right-angle cross-section defined by a bottom plate and a side plate, which frame is adapted to extend along at least a portion of the length of said groove on opposite sides of said slot with the bottom plate resting on the base of said groove and with the side plate extending upwardly from the side edge of the bottom plate remote from said side wall, a vertically disposed partition plate on the frame extending transversely thereof and defining a slide supply area and a slide take-up area on opposite sides of the partition plate, a pair of pressure plates parallel with said partition plate and mounted on said frame in said area, respectively, for movement longitudinally of the frame, resilient means on said frame engageable with each of said pressure plates for urging the latter toward said partition plate thereby adapting each of said pressure plates to support a number of slides in face-to-face relation with each other between the pressure plate and the partition plate in parallel relation with the latter, spring arm means mounted adjacent the side of said partition plate defining the take-up area, which spring arm means is adapted to deflect a slide from said supply area to said take-up area upon reciprocation of said slide changing mechanism, and guide means supported on said side plate and defining a guide opening for receiving said pusher bar, which guide means is adapted to cooperate with said pusher bar to position said frame axially of said groove upon being engaged by the pusher bar so that a slide in said slide supply area adjacent said partition plate is in alignment with said slide receiving slot.

5. The construction according to claim 4 wherein said guide opening is defined in part by opposite, vertical, inclined side walls of the guide means, whereby contact of the end of said pusher bar with one of said inclined walls causes movement of the frame axially of said groove for positioning of the frame.

6. In combination with a slide projector of the type including a generally horizontally extending slide tray receiving groove and a slide changing mechanism reciprocal transversely of the groove, which mechanism includes a pusher bar engageable with the outer edge of a slide for moving the latter from the groove to a viewing position in the projector and abutment means engageable with the inner edge of the slide for return of the latter from the viewing position to the groove, a photographic slide magazine comprising, an elongated frame seated in said groove and extending along at least a portion of the length thereof on opposite sides of said slide changing mechanism, a vertically disposed partition plate on said frame extending transversely thereof and defining a slide supply area and a slide take-up area on opposite sides of the partition plate, first and second pressure plates parallel with said partition plate and mounted on said frame in said supply and take-up areas, respectively, for movement longitudinally of the frame, resilient means on said frame engageable with each of said pressure plates for urging the latter toward said partition plate thereby adapting each of said pressure plates to support a number of slides in face-to-face contact with each other between each pressure plate and the partition plate in parallel relation with the latter, spring arm means mounted adjacent the side of said partition plate defining the take-up area, which spring arm means is adapted to deflect a slide from said supply area to said take-up area upon reciprocation of said slide changing mechanism, guide means on said frame adapted to cooperate with said pusher bar upon movement of the same toward said viewing position for locating the frame axially of said groove so that a slide in said supply area adjacent said partition plate is in alignment with said slide changing mechanism, and a projection on the side of said partition plate defining the take-up area engageable with the face of a slide being returned by said slide changing mechanism for preventing said second pressure plate from pressing the slide into parallelism with the partition plate until the slide is disposed wholly within the take-up area thereby preventing premature disengagement of said abutment means from the trailing edge of the slide upon its return.

References Cited by the Examiner

UNITED STATES PATENTS

| 2,513,102 | 6/1950 | Parlani et al. | 40—79 |
| 2,525,564 | 10/1950 | Simmons | 88—28 |
| 2,533,441 | 12/1950 | Estes | 40—79 X |
| 3,170,370 | 2/1965 | Mulch | 40—79 X |

EUGENE R. CAPOZIO, *Primary Examiner.*

WILLIAM GRIEB, *Assistant Examiner.*